April 5, 1966 R. F. WILEY 3,244,499
AXIALLY SEPARABLE NECK RING MOLD ASSEMBLY
Filed Aug. 17, 1962 2 Sheets-Sheet 2
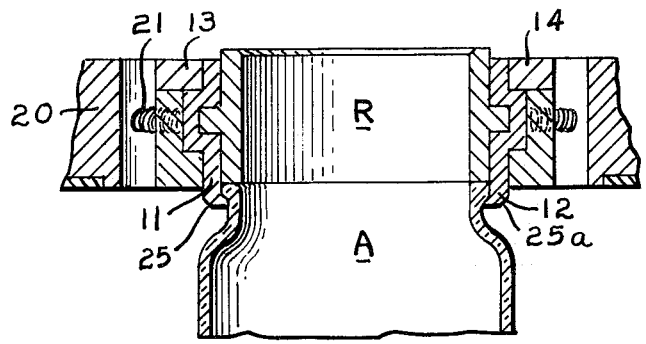
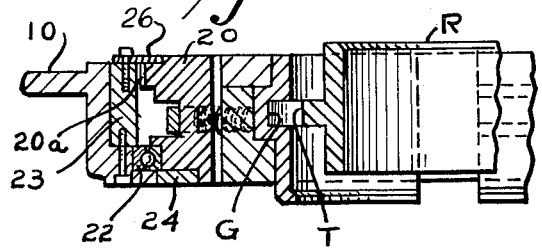
INVENTOR.
ROBERT F. WILEY
BY
Clarence R. Patty, Jr.
ATTORNEY

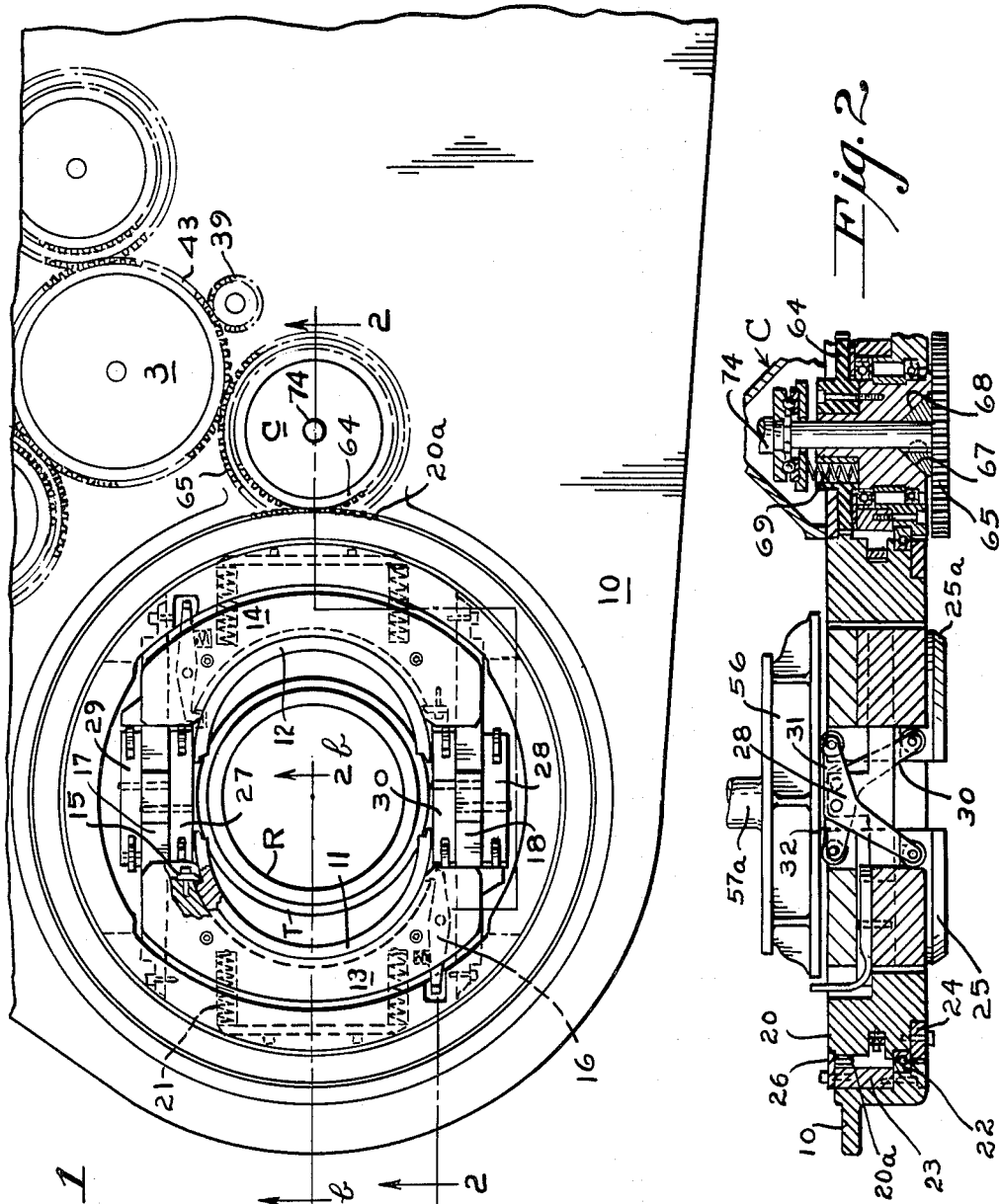

United States Patent Office 3,244,499
Patented Apr. 5, 1966

3,244,499
AXIALLY SEPARABLE NECK RING MOLD
ASSEMBLY
Robert F. Wiley, Corning, N.Y., assignor to Corning
Glass Works, Corning, N.Y., a corporation of New
York
Filed Aug. 17, 1962, Ser. No. 217,630
4 Claims. (Cl. 65—359)

The present invention relates to axially separable neck ring mold assemblies.

In the manufacture of articles of glassware, such as containers having a relatively large neck opening commonly called "wide mouth," the same is quite generally formed by what is known as the "press and blow" method. In such method, a charge of molten glass is dropped into a one-piece parison mold over which an axially separable neck ring mold has been arranged. A plunger is then lowered into the mold and under relatively high pressure, forces the glass into the neck ring mold and otherwise forms a compacted parison. The cavity of the parison mold is tapered in form in order that the parison mold may be lowered away from the neck ring mold after withdrawal of the pressing plunger, thereby leaving the parison suspended from the neck ring mold. Subsequently, a finishing mold is closed about the parison while it is being blown to final form. Mechanism is necessarily provided for rigidly holding the neck ring mold halves in their closed positions while pressing the parison. It is, of course, also essential that they remain closed to retain a parison suspended therefrom after the parison mold has been lowered from about the parison and while blowing the same to final form.

According to the invention, the axially separable neck ring mold assembly comprises two halves normally closed about a one-piece article top finishing ring suspended therebetween, with such halves supported for slideable movement between open and closed positions. The assembly is supported, as by a turrent, for moving the assembly from one station to another to successively position it for association with a parison mold, a finishing mold and a finished article receiving means respectively. It is also contemplated that the finishing mold may be of the paste mold type and accordingly provisions are included for rotating the assembly about its own axis when such rotation is considered necessary or desirable.

For a detailed description of the invention, reference is made to the accompanying drawings wherein:

FIG. 1 is a plan view of a fragment of a glass working machine embodying a turrent equipped with a neck ring mold embodying the invention, shown in its open position.

FIG. 2 is a sectional view taken generally along line 2—2 of FIG. 1.

FIG. 2a is a sectional view of a fragment of the neck ring mold when closed about an article.

FIG. 2b is a view taken on line 2b—2b of FIG. 1.

Referring to the drawings in detail, the neck ring mold assembly is shown confined within a circular opening in a carrier which conveniently comprises a turret 10 supported for rotation about a column 3. The neck ring mold assembly is composed of two halves 11 and 12 clamped to two semicircular holders 13 and 14 respectively by means of fixed and spring actuated latching members such as 15 and 16, to make them readily removable from their supporting holders. Holders 13 and 14 are slideably supported on slide rails 17 and 18 which, at their ends, are anchored to a support ring 20 and are normally urged by four springs such as 21 to their closed positions about a one-piece ring R which is provided so that there will be no parting line in the top surface of an article such as A (FIG. 2a) formed in such neck ring mold assembly. As will be observed, particularly in FIG. 2b, ring R has a tongue T formed therebout which occupies matching grooves such as G in the mold halves which serve to support the ring therebetween.

Support ring 20 is surrounded by a bearing 22 clamped within the opening in turret 10 between upper and lower clamps 23 and 24. An annular cover 26 carried by clamp 23 overlies the outer margin of the top of support ring 20 which, in the region below the cover, has a ring gear 20a formed therebout for effecting rotation of the neck ring mold halves 11 and 12 about their common center.

As will be observed, neck ring mold halves 11 and 12 have depending portions 25 and 25a, respectively, and are tapered inward toward their bore for encirclement by the upper end of a matching tapered bore wall of a blank mold cooperative therewith and which will rigidly hold the halves 11 and 12 together during the pressing of a charge within the confines of the cooperatively related neck ring mold and blank mold assemblies.

Rotation of the neck ring mold assembly may be effected in any desired fashion by utilization of the ring gear 20a thereof for this purpose. As illustrated, such rotation is effected by a motor driven gear 39 through the medium of a ring gear 43 rotatable about column 3, and gears 65 and 64 of a clutch assembly C respectively. Mating tapered surfaces 67 and 68 of such clutch assembly (FIG. 2) are normally held engaged under the influence of a number of springs such as 69 and are disengaged to stop rotation of the neck ring mold by depression of shaft 74.

To separate the ring mold halves 11 and 12 to release an article such as A (FIG. 2a) suspended therefrom, bell cranks 27 to 30 are provided. Bell cranks 27 and 28 are pivoted to slide rails 17 and 18 with their upper arms such as 31 overlaying a region to the right of the neck ring mold center line and their lower arms in cooperative relation with vertical surfaces of holder 13, and bell cranks 29 and 30 are similarly associated with holder 14, but with their upper arms such as 32 positioned to the left of the neck ring mold center line. As will be seen, therefore, by engagement and lowering of the upper arms of such bell cranks, as by an axially movable circular actuator plate 56 arranged thereover and actuated by a shaft 57a, the bell cranks 27 and 28 will slide half 11 to its open position, against the action of its closing springs, while bell cranks 29 and 30 will similarly slide half 12 to its open position, thus enabling the release of an article therefrom. At such time, the one-piece ring R remains supported from its tongue T which at the time continues to occupy the mold half grooves at their respective ends as indicated in FIG. 1.

For a disclosure of a complete glass forming machine embodying the invention, reference is made to applicant's copending application Serial No. 217,671 filed on even date herewith.

What is claimed is:

1. In a neck ring mold assembly embodying axially separable mold halves, holders for supporting said halves, rails upon which said holders are slideable to move such halves between open and closed positions, means for normally resiliently holding said holders in the positions in which the halves are closed, bell cranks, supports fixed with respect to said rails about which such bell cranks are pivoted, at least one of said bell cranks having one of its arms arranged adjacent one of two oppositely facing vertical surfaces of said holders and at least one of such bell cranks having its corresponding arm facing the other of such surfaces, the other arms of some of such bell cranks overlaying regions to the left of the center line of the neck ring mold halves and the other arms of the remaining of such bell cranks overlaying regions to the right of such center line whereby such bell cranks when turned about their pivots as by application of downward pressure on their other arms act on the respective holders to separate them with respect to one another.

2. An axially split neck ring mold comprising two halves, a carrier for said halves with respect to which they are laterally slideable relative to one another between open and closed positions, means arranged between said carrier and said halves resiliently holding them in their closed positions, bell cranks pivoted to said carrier about horizontally disposed centers parallel to the line of separation of such halves the one arm of each of said bell cranks being interposed between opposed vertical surfaces of said carrier with the other arms of some of such bell cranks projecting over and to the right of the center line of such mold halves and the other arms of other of said bell cranks projecting over and to the left of such center line whereby, by depressing the projecting arms of such bell cranks, the halves are separable from one another.

3. Apparatus as in claim 1 in which said assembly is rotatably mounted for driven rotation about its own axis.

4. In a neck ring mold assembly embodying axially separable neck ring mold halves, a one-piece top finish mold ring having an exterior tongue occupying grooves in such halves for its support thereby, means for resiliently holding said mold halves closed about said finish mold ring, means embodying a plurality of bell cranks for laterally separating such halves with respect to the center of such ring while continuing the support thereof, and means for rotatably supporting said assembly for driven rotation about its own axis.

References Cited by the Examiner
UNITED STATES PATENTS

| | | | |
|---|---|---|---|
| 687,595 | 11/1901 | Blue | 65—229 |
| 1,879,689 | 9/1932 | Kadow et al. | 65—360 X |
| 1,988,579 | 1/1935 | Smith | 65—360 X |
| 2,328,662 | 9/1943 | Meredith et al. | 65—307 |

DONALL H. SYLVESTER, *Primary Examiner.*